INVENTOR
LELAND F. BLATT

INVENTOR
LELAND F. BLATT
ATTORNEYS

United States Patent Office 3,546,956
Patented Dec. 15, 1970

3,546,956
HARMONIC ACTUATING UNIT FOR A POWER OPERATED WORKPIECE GRIPPING AND HANDLING MECHANISM
Leland F. Blatt, Grosse Pointe, Mich.
(24121 Mound Road, Warren, Mich. 48091)
Filed Aug. 11, 1969, Ser. No. 849,621
Int. Cl. F16h 35/02
U.S. Cl. 74—394                                                         7 Claims

ABSTRACT OF THE DISCLOSURE

A tool handling carriage adapted to mount power operated workpiece gripping jaws is reciprocated along guide rods or as an alternative, the carriage may be removed and the guide rods reciprocated to carry such gripping jaws into a small area. Reciprocating motion is created by a planetary gear system so designed as to have a minimum of width of rotation relative to the linear travel created by the system. The idler gear on a drive crank rotates around a stationary sun gear actuating a driven gear wherein the driven crank arm is coaxial with the planet gear and has one end for rotation thereon and is connected to the ends of the carriage guide rods or to a carriage mounted gripper to be reciprocated. The guide rods either reciprocating or stationary, are provided with two sets of linear bearings resisting thrust applied to the carriage or rods in any direction.

BRIEF DESCRIPTION OF THE INVENTION

This invention relates to a hypo-cycloidal mechanism producing simple harmonic motion while the carriage or guide rods are traveling along a straight center line. In the art of material handling equipment, it is frequently desirable to have a mechanism for producing reciprocating motion so that the part being carried by the carriage or guide rods, gripped or pushed, is accelerated at the start of the travel and decelerated at the end of the travel. The mechanism is capable of absorbing the interia loads and allowing the part, when released, to maintain a stationary exact position. Such a carriage may have mounted thereon a jaw type gripper which may be employed to pick up a workpiece, transport it into a machine such as a press, where an operation could be performed on the workpiece. When the work is complete, the jaw would grip the workpiece and remove it from the operation while a similar device would pick up and transport a fresh workpiece into the machine simultaneously.

It is an object of this invention to provide a drive mechanism capable of reciprocating at high speeds wherein the carriage or rods are smoothly and gradually accelerated and decelerated at each end of the stroke. It is further the object to provide a drive mechanism for reciprocating a carriage or drive rods which is simple and reliable and requiring a minimum of control or maintenance. It is still another object to provide a means of supporting the reciprocating guide rods or carriage which carry workpiece grippers and to effect an interchangeability of this carriage and reciprocating guide rods which are capable of carrying tooling or grippers. Both systems being capable of absorbing thrust in any direction.

These and other objects of this invention will become apparent from the following specification and claims when considered in conjunction with the accompanying drawings.

THE DRAWINGS

DETAILED DESCRIPTION

Figure 1:
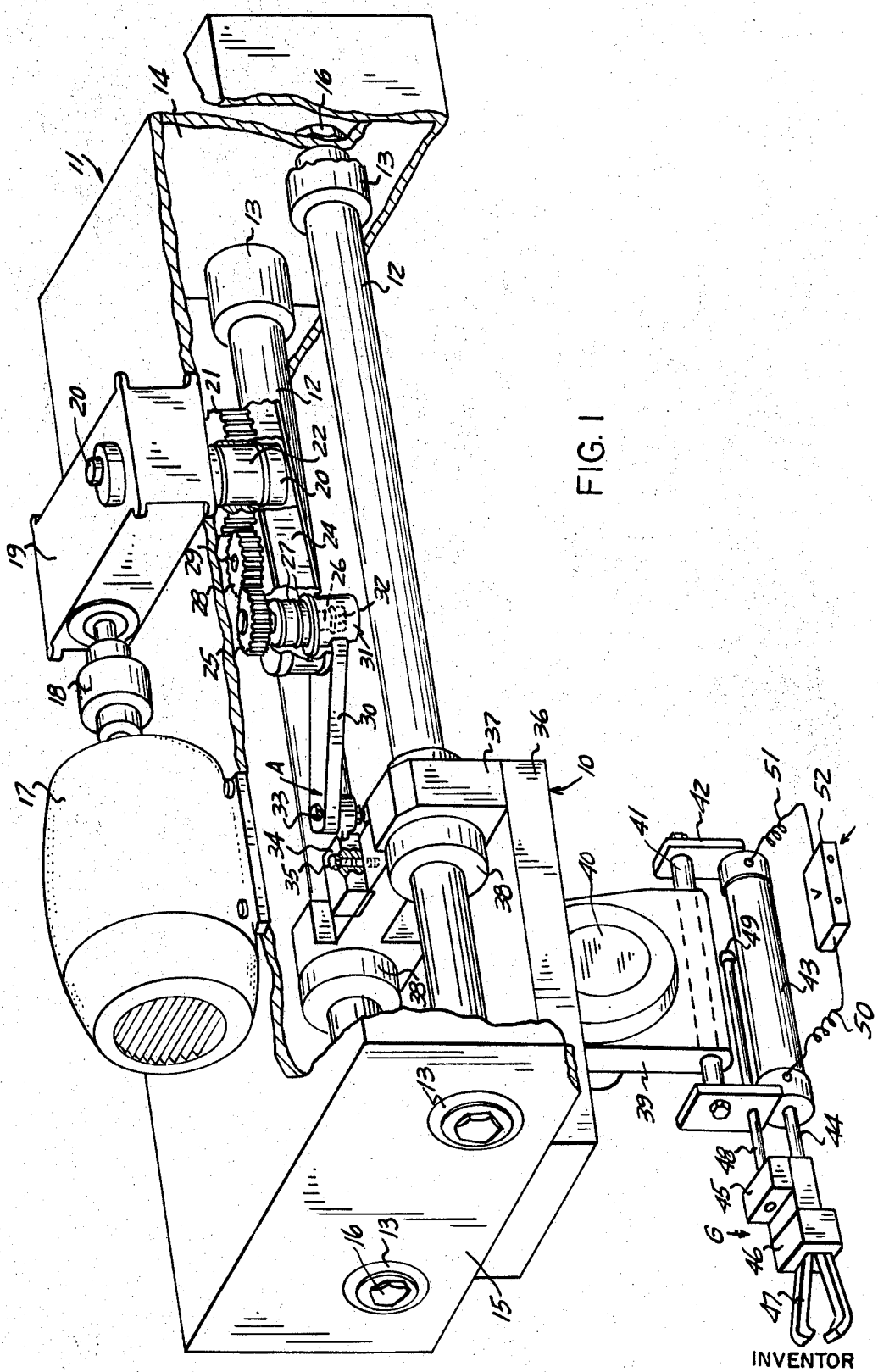
FIG. 1 is a simplified partly broken away perspective view of the feed mechanism and reciprocating carriage.

Referring to FIG. 1, and particularly the drive mechanism, generally comprises a reciprocating carriage 10, shown simplified for clarity, adapted to mount workpiece gripper assembly G. The actuation of the carriage assembly is accomplished by a power reduction unit and connected motor for actuating the present drive and driven links forming a part of the hypo-cycloidal harmonic motion drive mechanism. This mechanism produces reciprocating motion of carriage 10 within housing 11 and along the support shafts 12.

These shafts are positioned within said housing and supported at their ends within the respective bushings 13 nested within corresponding apertures in housing end walls 14 and 15 and secured thereto by fasteners 16. Electric motor 17 is secured upon said housing and its output shaft through a suitable coupling 18 connects the input of power reduction unit 19, whose output shaft 20 projects down into said housing, FIG. 1.

Said motor employs an efficient braking system adapted to stop very quickly after deenergization. In the operation of the present harmonic actuating unit, the control means is connected with said motor to deactivate the same after each complete revolution of output shaft 20 for a very short period; namely, a fraction of a second.

A hydraulic motor may be substituted for motor 17. Both major 17 and reduction unit 19 could be substituted by a fluid cylinder operating a rack gear adapted to drive a gear pinion on output shaft 20.

In the simplified perspective view of FIG. 1, same is broken away for clarity of illustration, said housing 11 providing the support means for the reciprocal carriage assembly 10 mounted upon the rods 12.

The hypo-cycloidal drive mechanism for producing harmonic reciprocating motion for said carriage includes a stationary sun gear 21 which is mounted on and underlies top wall of housing 11 and is fixed thereto coaxially of output shaft 20 which projects there below. Gear 21 mounts bushing 22 receiving shaft 20.

Drive crank 24 at one end is secured to shaft 20 for rotation therewith about its center line, and extends at right angles thereto and is spaced below gear 21.

Planetary gear 25 is affixed upon shaft 26 journaled through roller bearings 27 adjacent the outer end of said crank.

Idler gear 28 is journaled at 29 upon drive crank 24 and intermeshes with gears 21 and 25.

Driven crank 30 extends at right angles to shaft 26 and at its hub end 31 is fixedly secured to shaft 26 for rotation therewith.

As shown in FIG. 1, the collar or crank end 31 of driven crank 30 bears against the inner race of the lower tapered roller bearing while a collar on gear 25 rests on the inner race of the upper roller bearings. By adjusting and locking nut 32 upon shaft 26, a correct predetermined or preload is set upon the roller bearings 27.

By this construction, rotation of the planetary gear 25 effects a simultaneous rotation as a unit of its connected shaft 26 and the driven crank 30.

It is noted that the three gears 21, 28 and 25 lie in the same general plane.

Accordingly, upon rotation of crank 24, idler gear 28 in mesh with stationary gear 21, effects a simultaneous rotation of planetary gear 25 transmitting the correct rotation to driven crank 30 which is in a direction opposite from the direction of rotation of drive crank 24.

The free end of driven crank 30 is pivotally connected at 33 to one end of the link 34 whose opposite end is pivotally connected at 35 to carriage assembly 10.

The carriage assembly 10 or support means, as it is hereafter referred to, includes carriage plate 36 mounting at its opposite ends the upright pair of apertured blocks 37 mounting bushings 38 which are movably positioned on and along the length of rods 12 respectively. Block 37 is a drive block to which the link 34 is pivotally connected at 35.

Upon the present carriage assembly 10 or support means is mounted on adjustable bracket 39 adapted to mount tooling or grippers for workpiece transfer as generally indicated at G.

The mount for bracket 39 includes the trunnion assembly 40 whose axis extends at right angles to a direction of reciprocal motion of the carriage assembly to thus provide for adjustment of the workpiece transfer assembly indicated at G.

Structure and function and operation of this transfer device is fully set forth in my U.S. Pats. Nos. 3,371,583, 3,371,953 and 3,349,927 dated Mar. 5, 1968 and Oct. 31, 1967 and in my copending United States patent application, Ser. No. 815,658 filed Apr. 14, 1969 and entitled Dual Cylinder Actuating Unit. The detail of such patent and copending patent application is incorporated herein by reference and the specific details thereof are omitted herefrom.

Briefly, however, the present workpiece gripping and transfer device G includes the support rod 41 which is adjustably connected to the bracket 39; at its ends mounts a pair of plates 42 secured to opposite ends of the pneumatic cylinder 43.

This cylinder includes a reciprocal piston and piston rod 44 projecting therefrom connected to the pneumatic actuating and support mechanism 45 for the jaw assembly 46 mounting the pair of opposed operable jaws 47 adapted to engage a workpiece.

One function of the jaws 47 would be to grasp a workpiece holding the same in a horizontal plane, for example, and through the function of the cylinder 43 projecting the same onto bed or die of a press or other machine tool with the jaws releasing and the jaw assembly retracting for a machining operation. The transfer assembly G is adapted to then feed back into the machine tool and the jaws adapt to grip the workpiece, removing the same therefrom.

Actuating device 45 mounts an elongated rod 48 which projects through one of the plates 42 and mounts a stop 49 thereon, limiting the initial outward movement of the actuating device 45 on movement of the piston rod 44 in one direction.

Thus, the cylinder is capable of effecting longitudinal reciprocal movements of the actuating device 45 inwardly and outwardly, and at the end of a predetermined stroke determined by the stop 49, control opening and closing respectively of the jaws 47 of the jaw assembly 46 for gripping and/or releasing a workpiece.

Conduits 50 and 51 connect opposite ends of the air cylinder 43 to a valve 52 that connects to a source of air under pressure adapted for effecting reciprocal movements of the piston rod 44 of said cylinder.

Such movements are adapted to control the positioning of the actuator 45 and the functioning of the jaw assembly 46–47 in a predetermined sequence.

OPERATION

Rotation of output shaft 20 causes drive crank 24 to rotate. Drive crank 24 and driven crank 30 as dimensioned to each other, are ¼ the length of the total design reciprocation stroke. Rotation of drive crank 24 causes idler gear 28 to rotate about stationary gear 21 driving driven gear 25. Both idler gear 28 and driven gear 25 are ½ the pitch diameter of stationary gear 21. This relationship of pitch diameter controls the motion of Point A on the end of driven crank 30 keeping this point in a straight line through the complete reciprocating stroke. Rotation of driven gear 25 and crank 24 is necessary in opposite directions so that drive crank 24 and the axis of reciprocation at Point A of the carriage assembly 10 is parallel to guide rods 12. Link 34 is used to accept any misalignment created by wear or assembly in the meshing of the gear teeth on gears 21, 28 and 25.

The rotation of output shaft 20 is a constant angular velocity but through the planetary gear system and linkage, Point A on arm 30 starts at zero velocity, maximum acceleration, moving on a straight line and increasing in velocity until Point A is directly in line with shaft 20. At this point, maximum velocities will be reached and the deceleration part of the cycle will start with the acceleration decreasing and the velocity decreasing to zero at the opposite and last position of that end of the stroke absorbing any inertia loads through the harmonics of this mechanism.

The preceding discussion concerned a simple harmonic driven carriage for ½ cycle which would be similar for the other ½ of the cycle.

MODIFICATION

Figure 2:
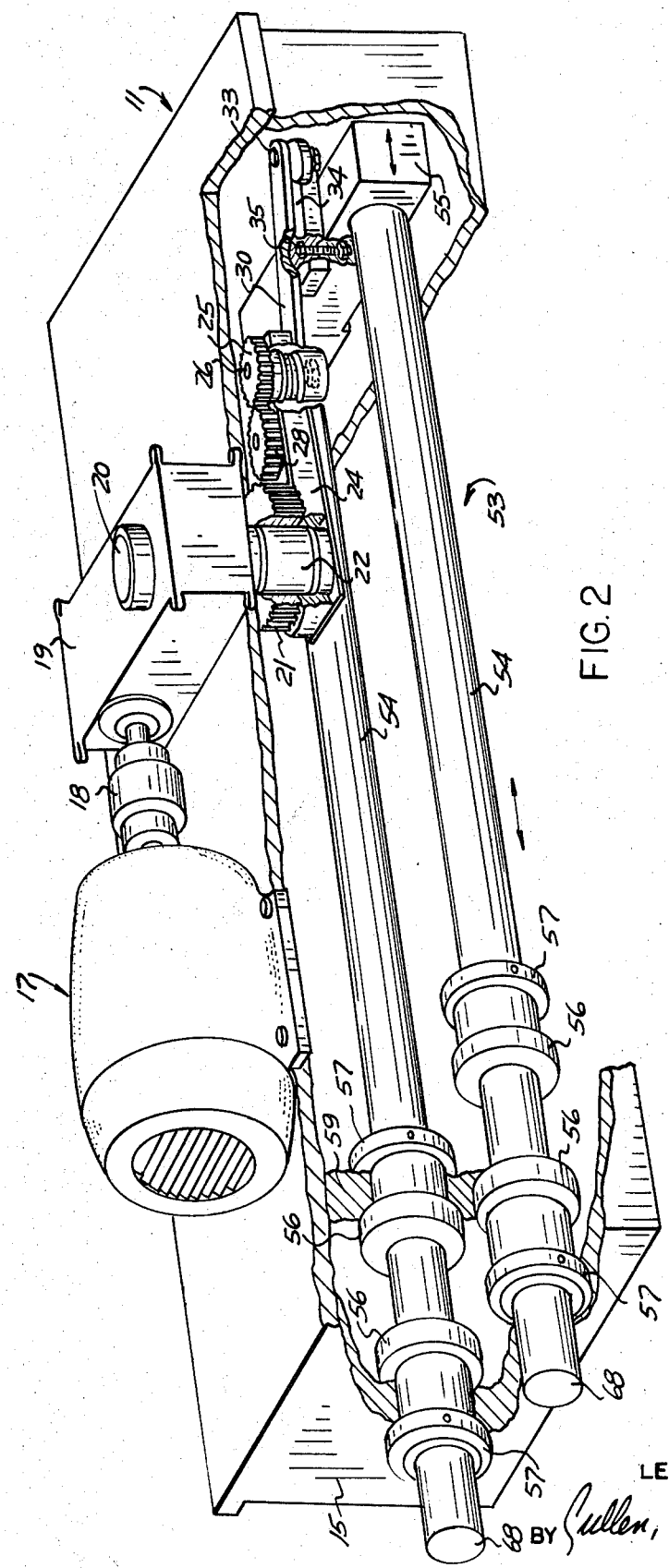
FIG. 2 is a simplified perspective partly broken away view of the mechanism and drive links employed and reciprocating guide rods.

To convert the carriage driven mechanism of FIG. 1 through a rod driven mechanism, there is shown a modified harmonic actuating unit in FIG. 2 which is partly broken away for clarity of illustration.

To convert the carriage mechanism of FIG. 1, all that is required with respect to FIG. 1, is to remove the retaining screws 16 along with the bushings 13 and the corresponding support rods 12 and the complete carriage assembly 10.

The linear bearing bulk head 59 is secured to housing 11 upon its interior spaced inwardly of end wall 15 suitably apertured corresponding to apertures in end wall 15 adapted to receive two sets of linear bearings 56 through which a pair of parallel spaced rods 54 extend making up the support means generally designated at 53.

The said support means thus include at the ends of the respective longitudinal reciprocal rods 54 the cross block 55 which is connected to the outer end of the driven crank 30 by a corresponding link 34. This link and its respective opposite ends is pivotally connected at 35 to the cross block 54 and at 33 to the free end of the driven crank 30.

The outer end portions 68 of rods 54 are adapted to have secured thereto adjustably a suitable workpiece gripping and handling mechanism such as shown at G in FIG. 1.

The operation above described is the same with respect to FIG. 2 except that upon rotation of the output shaft 20, simultaneous rotation in opposite direction of the drive and driven cranks 24 and 30 will effect a simple harmonic motion of the corresponding connected support means 53 including the rods 54 and cross bar 55 and the workpiece gripping assembly G in the same manner as above described.

The respective two sets of linear bearings 56 provide means for supportably mounting and guiding and receiving the pair of longitudinally reciprocal rods 54.

By this construction, the drive rods 54 will reciprocate and with a jaw or gripper being mounted on the end portions 68 of said rod. This provides a very low profile gripping mechanism, light in weight and adaptable for entering small work areas while reciprocating at high speeds.

The complete mechanism of FIGS. 1 and 2 may be enclosed by suitable protective screening.

Having described my invention, reference should now be had to the following claims.

I claim:
1. In a harmonic actuating unit for a power operated workpiece gripping and handling mechanism:
  a housing;
  a motor and connected power reduction unit secured to said housing including an output shaft projected into said housing;

support means guidably mounted upon said housing for reciprocal straight line motion in a plane at right angles to said output shaft;

said support means adapted to adjustably mount thereon a workpiece gripping and handling mechanism for corresponding reciprocal movements;

and a hypo-cycloidal mechanism within said housing for producing a simple harmonic reciprocating motion operably interconnected with said output shaft and support means;

said hypo-cycloidal mechanism including: a fixed gear secured on said housing coaxial of said output shaft;

a drive crank adjacent one end secured to the output shaft extending at right angles thereto;

a planetary gear journaled adjacent other end of said crank on an axis parallel to said shaft;

an idler gear journaled on said crank interconnecting said fixed gear and planetary gear;

a driven crank at one end fixed to said planetary gear and rotatable in a plane parallel to the plane of rotation of said drive crank;

and at its other end pivotally connected to said support means;

whereby a single revolution of said output shaft and drive crank in one direction effects a smultaneous corresponding rotation of the driven crank in the opposite direction, in turn, effecting a complete reciprocating stroke of said support means;

said shaft adapted to rotate at a constant velocity, said support means starting at 0 velocity and maximum acceleration moving in a straight line and increasing in velocity to a maximum velocity at a midpoint in line with output shaft, with gradual deceleration and velocity decreasing to 0 at the opposite end of the stroke.

2. In the harmonic actuating unit of claim 1, the mounting of said support means including a pair of parallel spaced guide rods within said housing and at their ends secured thereto and equidistant and spaced from said output shaft.

3. In the harmonic actuating unit of claim 2, said support means including a carriage plate adapted to mount said workpiece gripping and handling mechanism;

apertured support blocks projecting from its opposite ends;

mounting bushings guidably positioned over and movable along the length of said rods.

4. In the harmonic actuating unit of claim 2, the connection of said driven crank to said support means including a link at its respective opposite ends pivotally connected to said support means and to said driven crank respectively.

5. In the harmonic actuating unit of claim 2, said support means including a carriage plate;

apertured support blocks projecting from its opposite ends mounting bushings guidably positioned over and movable along the length of said rods;

a trunnion on the undersurface of said carriage plate;

and an upright jaw assembly mounting plate on said trunnion and pivoted on an axis at right angles to the path of reciprocating motion of said support means.

6. In the harmonic actuating unit of claim 1, said support means including a pair of parallel spaced rods within and extending the length of said housing and adjacent their one ends guidably mounted thereon through bushings adapted for reciprocal projection from said housing at one end thereof; and an apertured bulkhead upon the interior of said housing depending therefrom intermediate its ends and adjacent one end, mounting bushings guidably and supportably receiving said rods.

7. In the harmonic actuating device of claim 6, the connection between said driven crank and said support means including a drive block transverse of and secured to the one ends of said rods; and a link at its respective opposite ends pivotally connected to said drive block and to said driven crank respectively.

References Cited

UNITED STATES PATENTS

| 3,127,777 | 4/1964 | Pietsch | 74—394X |
| 3,407,678 | 10/1968 | Steinke | 74—394 |
| 3,435,790 | 4/1969 | Hale | 74—394X |

LEONARD H. GERIN, Primary Examiner